United States Patent [19]

Horler et al.

[11] Patent Number: 5,676,071

[45] Date of Patent: Oct. 14, 1997

[54] METHOD AND DEVICE FOR INTRODUCING A LIQUID OR GASEOUS TREATMENT MEDIUM INTO A FLUE GAS FLOW

[75] Inventors: Stefan Horler, Brütten, Switzerland; Andreas Kemter, Radolfzell; Thomas Nikolaus, Allensbach, both of Germany

[73] Assignee: Techform Engineering AG, Switzerland

[21] Appl. No.: 553,489

[22] PCT Filed: Mar. 21, 1995

[86] PCT No.: PCT/CH95/00063

§ 371 Date: Feb. 27, 1996

§ 102(e) Date: Feb. 27, 1996

[87] PCT Pub. No.: WO95/25931

PCT Pub. Date: Sep. 28, 1995

[30] Foreign Application Priority Data

Mar. 21, 1994 [DE] Germany ............... 44 09 639.9

[51] Int. Cl.⁶ .................................................. F23J 11/00
[52] U.S. Cl. .................... 110/345; 110/190; 110/215; 422/111; 422/168; 122/4 D; 423/235
[58] Field of Search ........................ 110/190, 215, 110/345; 422/111, 168; 423/212 C, 215.5, 235; 122/4 D

[56] References Cited

U.S. PATENT DOCUMENTS

| | | | |
|---|---|---|---|
| 4,440,100 | 4/1984 | Michelfelder et al. | 110/345 |
| 5,103,742 | 4/1992 | Valentino | 110/345 X |
| 5,260,042 | 11/1993 | Martin | 423/235 |
| 5,326,536 | 7/1994 | Carter . | |
| 5,478,542 | 12/1995 | Chawla et al. | 423/235 |

FOREIGN PATENT DOCUMENTS

| | | |
|---|---|---|
| 3736306 | 9/1988 | Germany . |
| 3728557 | 3/1989 | Germany . |
| 3811636 | 3/1989 | Germany . |
| 3935400 | 8/1990 | Germany . |
| 3935402 | 2/1991 | Germany . |
| 3935401 | 6/1991 | Germany . |
| 4019037 | 12/1991 | Germany . |
| 4027040 | 12/1991 | Germany . |
| 4027819 | 3/1992 | Germany . |
| 4130348 | 3/1993 | Germany . |
| 4139862 | 6/1993 | Germany . |
| 87/05531 | 9/1987 | WIPO ................. 422/111 |
| 9106506 | 5/1991 | WIPO . |

Primary Examiner—Henry A. Bennett
Assistant Examiner—Susanne C. Tinker
Attorney, Agent, or Firm—Speckman, Pauley & Fejer

[57] ABSTRACT

A method and apparatus for introducing a liquid or gaseous treatment medium into a flue gas stream wherein a total adjustment value for controlling the amount of active substance in the treatment medium is generated by an actual value measurement of a flue gas component and a comparison with a set value, and the treatment medium is injected through a plurality of nozzles into the flue gas stream flowing through a flow chamber. The flow chamber is divided into a three-dimensional matrix of partial flow chambers, each of which comprises a nozzle and measuring devices for detecting the temperature and flow speed of the flue gas stream in the partial flow chambers. The active substance is injected with a constant volume flow of treatment medium in an amount determined by calculation of an individual adjustment value of active substance for each nozzle. The total of the individual partial adjustment values does not exceed the total adjustment value of the active substance. Nozzles having a partial adjustment value of zero are not activated such that, in each column of the matrix injection occurs only in a single partial flow chamber.

13 Claims, 5 Drawing Sheets

METHOD AND DEVICE FOR INTRODUCING A LIQUID OR GASEOUS TREATMENT MEDIUM INTO A FLUE GAS FLOW

BACKGROUND OF THE INVENTION

1. Field of the Invention

This invention relates to a method and a device for introducing a liquid or gaseous treatment medium into a flue gas flow. In particular, this invention relates to the introduction of a nitrogen oxide removal medium or a dioxin inhibitor into the flue gas flow of a furnace in order to reduce the nitrogen oxide components or dioxins being generated in the flue gas during the combustion process.

2. Description of Prior Art

Various gaseous compounds harmful to the environment and health are known to be generated in furnaces. It is, thus, desirable to remove as much as possible of said compounds from the flue gas. Emission threshold limits are prescribed by lawful regulations and may not be exceeded in any way. Although the description which follows relates generally to nitrogen oxides (NOx), it should be pointed out here that the problems in general and the proposals for their solution are described herein are also applicable to the treatment of other chemical compounds.

Nitrogen oxide removal from flue gases is mostly performed today by catalytic reduction, that is by splitting the nitrogen oxides into nitrogen and water vapor with the addition of ammonia in the presence of a catalyst. The ammonia is added in the form of "aqueous ammonia", or in the form of solid ammonia compounds dissolved in water, to the flue gas flow. Although the desired chemical reaction takes place over a relatively wide temperature range, the degree of reduction is only satisfactory within a narrow temperature range. It is therefore necessary to assure that the ammonia molecules mix with the nitrogen oxide molecules within this temperature range. If the process is not optimally performed, the emission of nitrogen oxides and/or unused ammonia rapidly attains unsatisfactory values. Furthermore, excessive amounts of treatment medium are used up in the course of a non-optimal performance of the process. Finally, the thermal efficiency of the furnace is also lowered by excessively large amounts of supplied treatment medium, in particular excess amounts of supplied water in which the actually effective substances are dissolved.

One method for controlling the amount of a treatment medium supplied for nitrogen oxide removal from flue gas is taught by German Patent DE 41 39 862 A1, wherein the addition of the treatment medium is controlled as a function of the concentration of ammonia in the exhaust gas, and taking into consideration the nitrogen oxide content in the exhaust gas. Fairly satisfactory results can be obtained depending on the type of the furnace controlled in this way. However, it has been shown that improvements are required, particularly in larger furnaces with correspondingly larger flue gas conduits.

One method for introducing a treatment medium into a flue gas flow is taught by German Patent DE 39 35 400 C1, which also relates to the removal of nitrogen oxide from flue gas. In accordance with this known method, treatment medium is introduced into the flue gas at only those locations where it has been determined by the use of an optical sensor that there is no flame present at the time, because it has been found that the injected chemicals are always destroyed at the places where a flame actually licks up into the flow chamber. However, this method also does not provide completely satisfactory results.

To assure the optimal feeding of treatment media, a special form of nozzles is disclosed by German patent reference DE 39 35 401 A1 and DE 39 35 402 A1, through which the treatment medium is intended to be sprayed into the flue gas conduit. It is respectively proposed in these publications to perform the mixing of the actually effective substance with the carrier substance (water) as closely as possible to the nozzle opening. However, no optimal results can be achieved by this either.

SUMMARY OF THE INVENTION

It is an object of this invention to provide a method for introducing a treatment medium into flue gases in such a way that it is possible to achieve improved emission values and simultaneously improved heat efficiency and to provide an appropriate device for executing this method.

These and other objects of this invention are achieved by a method for introducing a fluid treatment medium, such as a nitrogen oxide removal medium or dioxin inhibitor, into flue gases wherein a total adjustment value for control of the feeding of the active substance of the treatment medium is generated by measurement of a flue gas component and comparison of the resulting value with a set value, and the treatment medium is injected through a plurality of nozzles into the flue gas stream flowing through a flow chamber. The flow chamber is divided into a three-dimensional matrix of partial flow chambers to which a nozzle is respectively assigned as well as measuring means for detecting at least the temperature and flow speed in each said flow chamber. An individual partial adjustment value for the active substance is continuously determined for each nozzle and the active substance is injected with a constant volume flow of treatment medium. The total of the individual partial adjustment values does not exceed the total adjustment value of the active substance and the nozzles having a partial adjustment value of zero are not activated, so that in each column of the matrix, injection occurs only in a single partial flow chamber.

A device for execution of this method in accordance with one embodiment of this invention comprises a flow chamber divided into a three-dimensional matrix of partial flow chambers located on top of each other on two levels. All of the partial flow chambers of one level adjoin a flow chamber wall and are approximately of the same size. A nozzle and measuring means for detecting at least the temperature and flow speed within each partial flow chamber are disposed within the flow chamber wall adjoining each said partial flow chamber. At least one control device is provided by which the partial treatment medium flows for the individual nozzles can be calculated and controlled as a function of a total adjustment value which is generated from an actual value measurement of a flue gas component and a comparison with a set value and from the signals of said measuring means whereby the activated nozzles all perform injection with the same constant volume stream, but with an individual amount of active substance in the carrier medium.

This invention is based on the principle that it is of cardinal importance that the treatment medium, with the correct concentration of an active substance metered in, be injected into the flow chamber only at those locations where the flue gas has the criteria required for such injection. The flue gas flow is basically strongly inhomogeneous. This means that, viewed in cross section in respect to the flow direction, it has different temperatures and different flow speeds. For example, the temperature can be highest approximately in the center while dropping towards the edge of the flow chamber—or the temperature can attain its peak value in a raised corner. Furthermore, it is, for example, possible that the flow speed can be considerably greater on one side of the flow chamber as well as toward the center than on the other side of the flow chamber. Sometimes it can even be observed that negative speeds occur on one side of the flow chamber, that is the flue gases form a cylinder. Thus there is a noticeable deviation from a laminar flow and accordingly turbulences occur. If the isothermal lines extending in the flow chamber are considered, they form a dome or bell shape, for example, in the interior of the flow chamber, wherein this shape can be deformed and therefore also asymmetric. In other cases, a saddle shape is detected, or the shape of a cloth pulled up on one corner, etc., etc. In each case, the envelope for all points located within the ideal temperature window is a three-dimensional structure also having a defined extension in the flow direction. This is mainly connected with the different flow speeds distributed over the flow chamber cross section. Accordingly, the temperature windows in which injection of the treatment medium is supposed to take place are also located along such a three-dimensional geometric shape. It is therefore not the case that the points inside the ideal temperature range inside the flow chamber essentially form an approximately level section extending crosswise through it and that this approximately level section in the flow chamber merely wanders up or down, depending on the combustion conditions. Rather, it appears that the methods up to now were based on this premise and, accordingly, injection was always performed only on a defined level in the flow chamber, wherein it is possible to make a selection between two or three different levels. This invention departs from this known method and is based on the realization that the points within an ideal temperature range are geometrically located inside a three-dimensional structure, namely for example within a bell shape, dome shape or other arbitrary three-dimensional shape. In accordance with this invention, the flow chamber of the flue gas is therefore divided into a three-dimensional matrix of partial flow chambers. Respectively, one nozzle is assigned to each partial flow chamber formed in this way which then, according to the conditions at the time, in particular in respect to flow and/or temperature, feeds more or less of the active substance of the treatment medium into the treatment chamber. It is possible by this nozzle arrangement and injection control to adapt the amount of active substances needed, as well as the injection location within the ideal temperature range, more accurately to the geometric shape of the envelope enclosing these points. The ammonia slippage and/or the remaining amount of nitrogen oxide are overlappingly monitored, that is similar to a cascade control, so that it is possible to control the total amount of treatment medium supplied accordingly.

It has been surprisingly shown that considerable improvements over methods known up to now can be achieved. In particular, an optimal local injection is provided by this invention, in that every nozzle reacts individually to local temperature variations or to the flow present. Consequently, the entire system reacts considerably more dynamically, more sensitively and more rapidly to temperature fluctuations then had been the case up to now. This in turn results in a considerable increase in the degree of nitrogen oxide removal along with a reduced treatment medium supply.

Preferably, the flow chamber is divided into at least two groups of partial flow chambers located behind each other when viewed in the flow direction. As a result, it is possible to utilize the optimal temperature range more easily in the event of increasing flow speed and therefore a displacement of higher temperatures in the direction away from the site of combustion. The partial flow chambers are preferably made to be essentially of the same size. This results in simplification regarding the required nozzles as well as the associated controls, since only one "order of magnitude" of both is needed. The partial flow chambers are preferably chosen to be respectively adjoining one wall of the flow chamber. Consequently, it is possible to operate with nozzles which project only slightly into the flow chamber. Preferably flue gas flow values, that is flow speeds, are measured in addition to the temperature measurement values. They are taken into account when obtaining the representative measured values by which control is performed. By taking into account this additional parameter, it is possible to achieve a further increase in the efficiency of nitrogen oxide removal. Treatment medium is only injected in those partial flow chambers in which the measured temperature values lie within a predetermined reaction temperature range. If the temperature is lower (or higher), no treatment medium at all is introduced into these partial flow chambers.

To create the treatment medium, an active substance, known per se, is admixed to a carrier medium, preferably water, as a function of the partial set value associated with the respective partial flow chamber in such a way that the volume flow emanating from a nozzle is essentially constant and independent of the partial set value. As a result, it is possible to produce a constant atomizing behavior of the nozzles particularly easily. Those nozzles which are assigned to partial flow chambers wherein the measured temperature values lie outside of the defined temperature range are preferably completely deactivated. This means that with a regulation to "0", the active substance concentration in the carrier medium is no longer controlled down to "0" (as was customary up to now), while continuing to inject carrier medium, but instead no longer lets the respective nozzle inject. Thus, it is possible to increase the thermal efficiency of the furnace. In this case, it is of particular advantage for the deactivated nozzles, to be removed from the flow chamber. In this way, trouble with the nozzles because of soiling, corrosion, etc. are prevented.

The treatment medium is preferably supplied to the nozzles at high pressure, preferably above 10 bar, particularly preferably above 50 bar. It is proposed in contrast to the known nozzles cited at the outset, which operate at low pressure, to operate at high pressure. Thus, the injection behavior only slightly varies at, considered absolutely, large pressure variations of 1 to 3 bar.

The above remarks also apply to the device in accordance with this invention. It should be mentioned in this connection that the temperature sensors are preferably embodied as difference temperature measuring sensors, which can be done by means of a subtracting circuit disposed downstream of two separate temperature sensors, or by the design of the temperature measuring sensors themselves. In accordance with another embodiment, a radiation energy detector is employed. It determines the radiation energy from each of the partial flow chambers, so that it can be determined in which partial flow chamber the desired temperature range is located. The flow speed of the flue gases can be derived from the temperature difference between two measuring points (if further parameters are known), so that the previously mentioned control as a function of the flow speed and the temperature can be easily performed. It is of course also possible to determine the speed of the flue gases directly.

In accordance with one embodiment of the device of this invention, the device includes nozzles which are designed to be displaceable and fastened in a wall of the flow chamber in such a way that they can be displaced from a deactivation position outside of the flue gas flow into an activation position inside the flue gas flow. It is possible to achieve very considerable advantages by this design of the nozzles. A nozzle which is deactivated, thus does not inject any treatment medium, is exposed to considerable stresses in the flue gas flow. These are, in particular, corrosion or the plugging of the nozzle by solid material particles and condensates carried along in the flue gas. Furthermore a nozzle which is deactivated, and thus does not conduct any carrier medium, becomes hot, so that separate cooling steps are required. To assure such cooling or protection against dirt, the nozzles are designed as coaxial tubes and air, for example, is allowed to flow in the outer jacket. Ceramic nozzles, which can tolerate greater stresses, have also been suggested in an alternative way. However, in both cases, the diameter of such a nozzle becomes so large that the distance between the fin tubes, which customarily form the wall of the flow chamber, or the width of the lands between the fin tubes, is no longer sufficient to lead the nozzles through. In these cases, bends in the fin tubes must be provided, which are connected with extremely high costs and also entail mechanical as well as thermal disadvantages. In contrast to this, the nozzles used here can be manufactured with such narrow diameters that they easily pass even between fin tubes which lie closely together. Separate cooling of the nozzles in their active state, in which they project into the flow chamber, is not required. They can be retracted in the deactivated state far enough that there is no longer a direct contact with the flue gases. Furthermore, a flow channel is provided all around the nozzles, through which air is blown and any penetration of dirt particles, etc., is prevented in this way.

BRIEF DESCRIPTION OF THE DRAWINGS

These and other objects and features of this invention will be better understood from the following detailed discussion taken in conjunction with the drawings, wherein.

DESCRIPTION OF PREFERRED EMBODIMENTS

Figure 1:
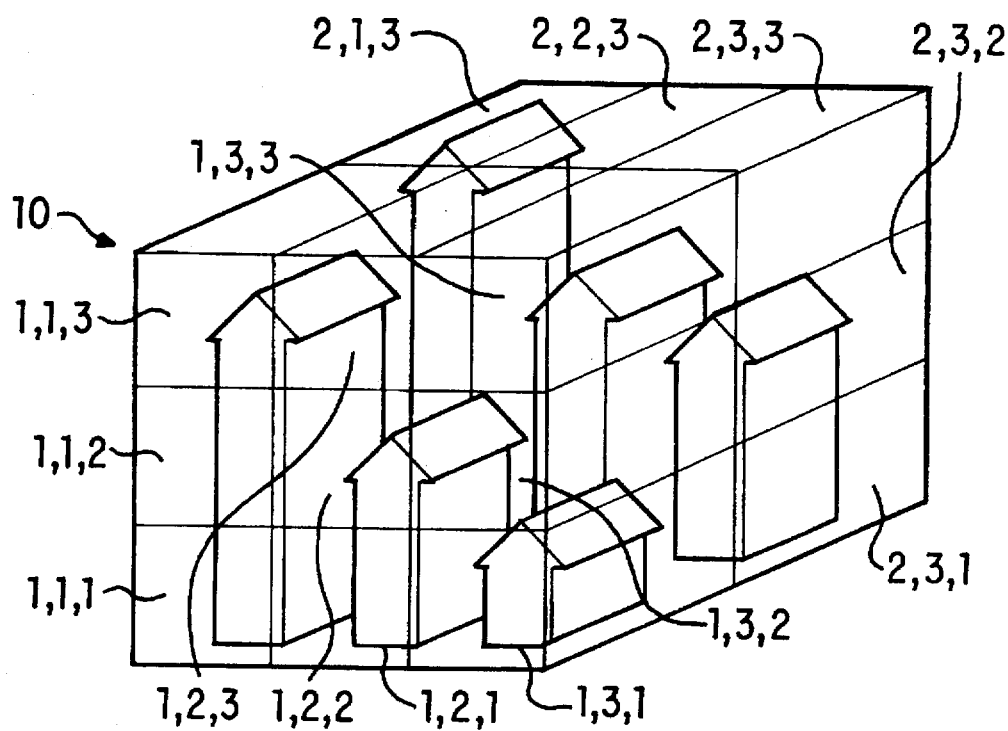
FIG. 1 is a diagrammatic representation of a flow chamber in accordance with this invention.

FIG. 1 shows a perspective view of a flow chamber 10 in accordance with one embodiment of this invention of a furnace, wherein this chamber—depending on the type of furnace—can be disposed in the actual furnace or further away from it in a flue gas conduit. In the exemplary embodiment here shown, flow chamber 10 is divided into partial flow chambers 1.1.1; 1.1.2; . . . 2.3.3. All of these partial flow chambers are of essentially the same size and are cuboidally designed and their total constitutes the entire flow chamber 10. The hot flue gases flow through this flow chamber 10, wherein in FIG. 1 the flow speeds, which are different across the cross section of the flow chamber 10, are indicated by the three-dimensional arrows shown there by the length of the arrows. Inhomogeneous flow conditions of this type are found in connection with garbage-burning installations in particular and they correspond to the inhomogeneities of the supplied fuel distributed, for example, on a fire grate.

Figure 2:
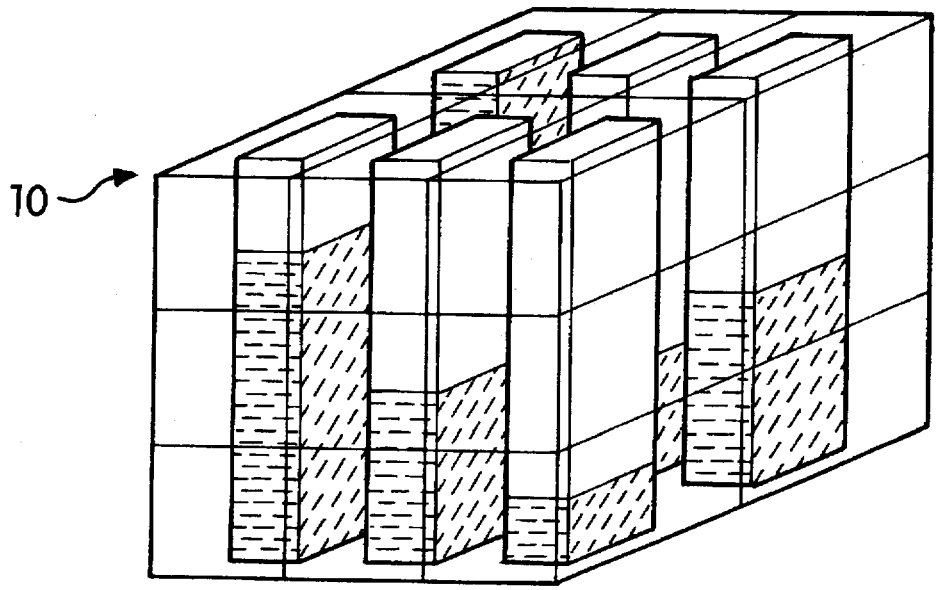
FIG. 2 is a diagrammatic representation of FIG. 1 for showing the temperature conditions prevailing in the flow chamber.

Temperature ranges are indicated in FIG. 2, wherein the areas shown in dashed lines correspond to temperatures located within a predetermined temperature range, while the areas not shown in dashed lines are intended to indicate temperatures lying outside of the temperature range. The temperature range is defined in a manner known per se in that, when injecting a nitrogen oxide removal medium into the flue gases of temperatures inside the temperature range, it is possible to detect an optimal nitrogen removal effect with little slippage.

Figure 3:
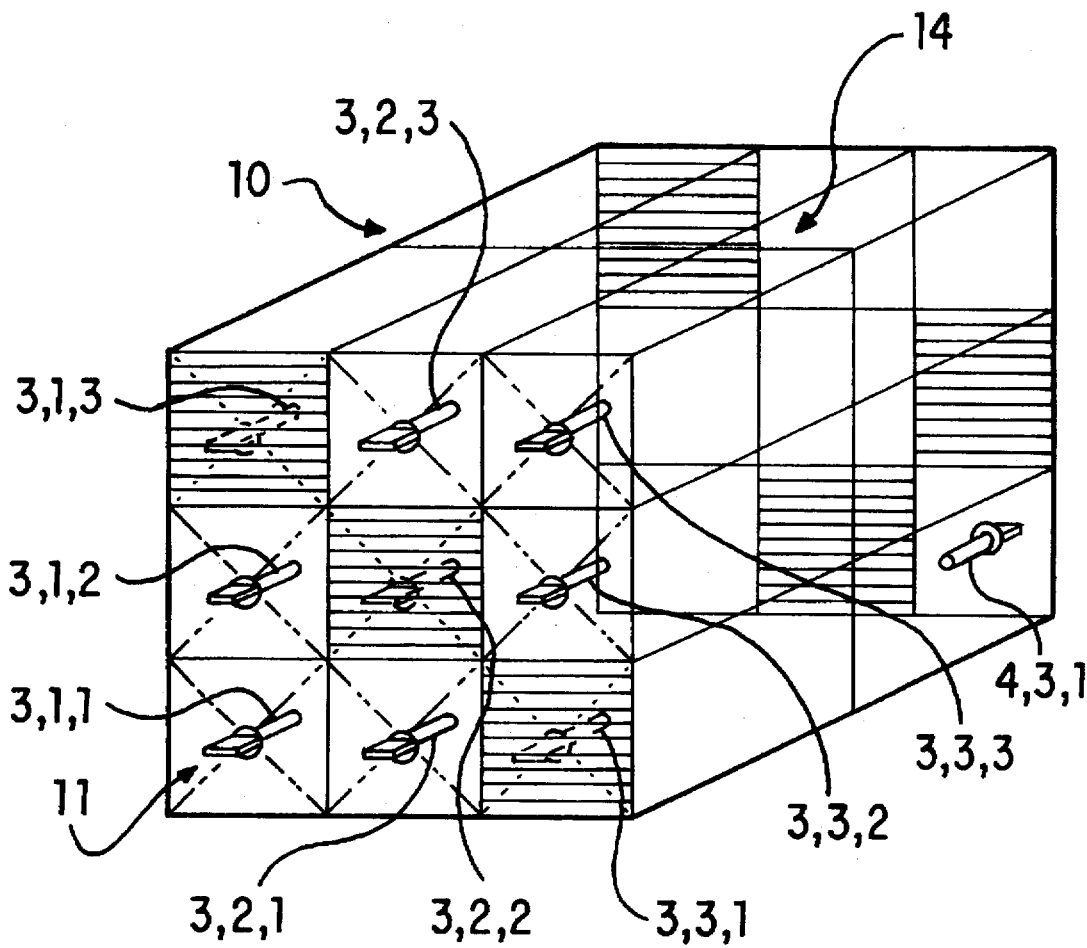
FIG. 3 is a diagrammatic representation of FIGS. 1 and 2 for showing the nozzle arrangement and their mode of operation.
Figure 4:
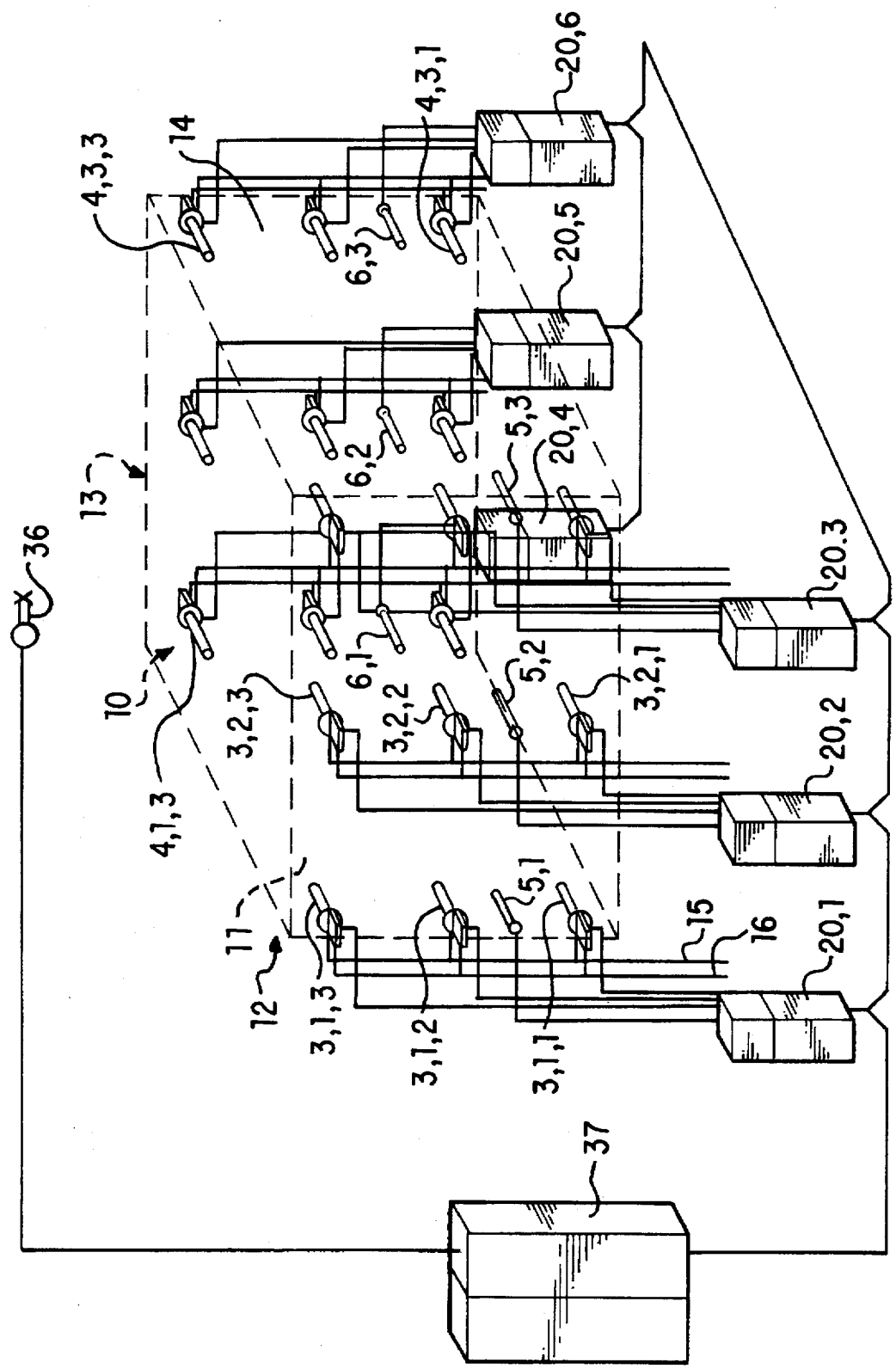
FIG. 4 is a schematic view of a flow chamber in accordance with this invention.

An arrangement of nozzles 3.1.1; 3.1.2; . . . 4.3.1 is shown in FIG. 3 and in FIG. 4. Only a portion of the nozzles is represented in FIG. 3. These nozzles 3 . . . 4 are arranged in oppositely located walls 11 to 14, which enclose the flow chamber 10, in such a way that each one of the previously described partial flow chambers 1 . . . 2 can be supplied with a treatment medium by a nozzle 3 . . . 4, wherein the injection of the treatment medium essentially is made in a fan shape in such a way that an essentially even flow of treatment medium is assured over the flow cross section of each partial flow chamber.

In accordance with the example shown in FIG. 3, only those nozzles are activated in whose associated partial flow chambers 1 . . . 2 the gas flow lies within the temperature range. The nozzles 3 . . . 4 emitting a treatment medium are indicated in FIG. 3 by shading of their associated level elements. As can be seen from FIGS. 2 and 3, treatment medium is therefore injected into those partial flow chambers in which optimal conditions for nitrogen oxide removal are present. In this case, it is also possible to take flow speeds (corresponding to the lengths of the arrows in FIG. 1) into account.

The partial temperatures in the partial flow chambers 1 . . . 2 are determined by temperature sensors 5.1; 5.2; . . . 6.3, which are shown in FIG. 4. Thus, with this exemplary embodiment of the invention, only a single temperature sensor 5 . . . 6 is assigned to each group of partial flow chambers 1 . . . 2 lying above each other. In this exemplary embodiment, the individual temperatures in the partial flow chamber 1 . . . 2 are derived from known flow parameters, which are intrinsic to the system of the respective furnace in which the arrangement is installed. It is furthermore possible to scan the individual temperatures on the basis of measured or known flow conditions or by means of several temperature sensors. However, it is essential that it be determined for each partial flow chamber whether the flue gases present there have temperatures within or outside of the temperature range.

The nozzles 3 . . . 4 and temperature sensors 5 . . . 6 shown in FIG. 4 are respectively connected to control devices 20.1; 20.2 . . . 20.6. In turn, these control devices 20 are connected to an aggregate controller 37, which is supplied with an output signal of an actual value sensor 36 measuring the nitrogen oxide content and/or the (ammonia) slippage in the exhaust gas. The nozzles 3 . . . 4 are furthermore connected to a cooling air line 15 and a control air line 16.

Figure 5:
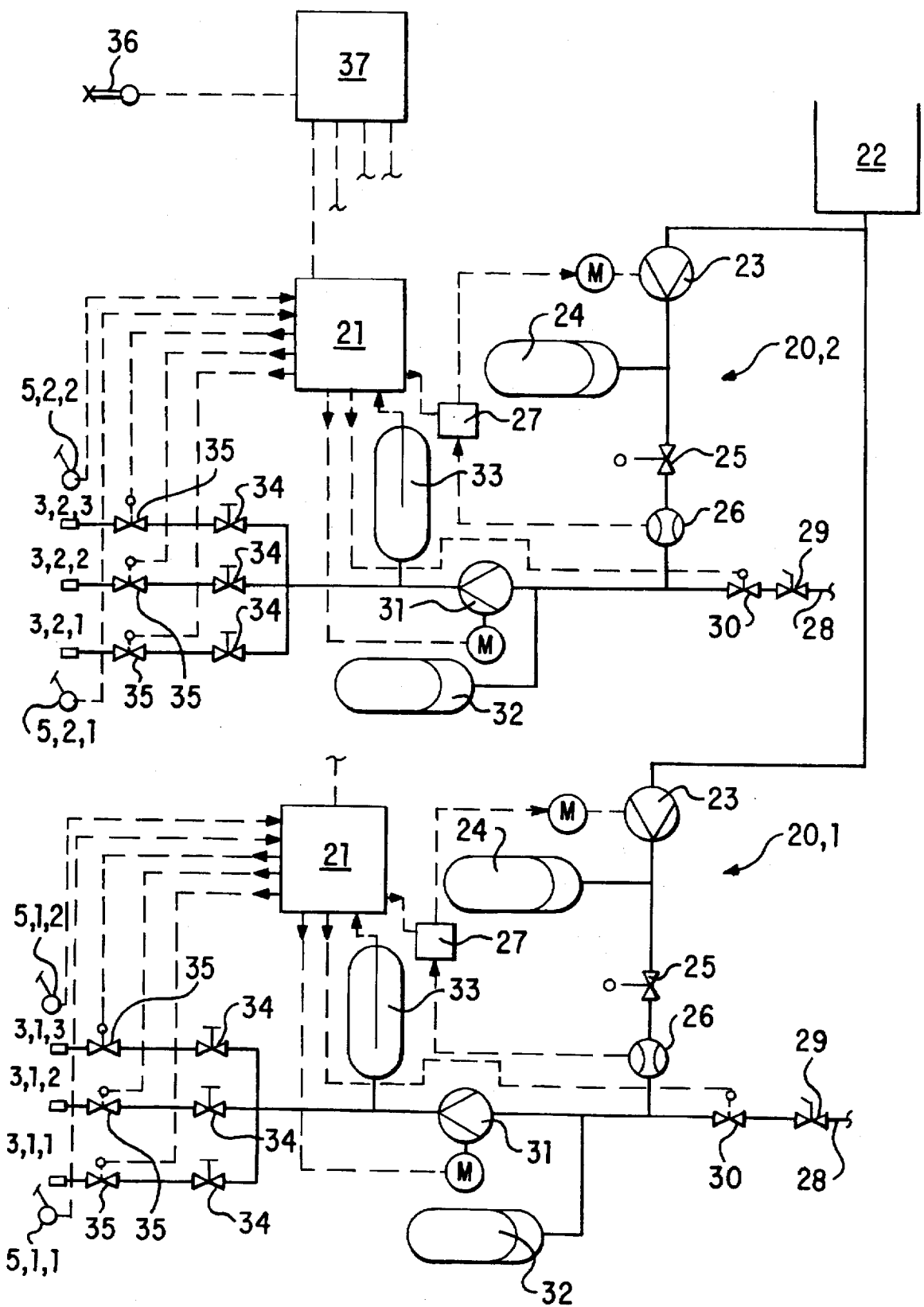
FIG. 5 is a schematic diagram of the control circuits of this invention.

An exemplary embodiment of a control of the arrangement shown in FIG. 4 is shown in FIG. 5. An active substance reservoir is indicated in the drawing by the reference numeral 22, which reservoir contains, for example, ammonia water (aqueous ammonia) of a preset concentration or an ammonia salt dissolved in water and suitable for nitrogen oxide removal. The active substance reservoir 22 is connected through lines to the control device 20, only two of which (20.1 and 20.2) are shown. More precisely stated, the active substance reservoir 22 is connected to the aspiration side of a metering pump 23, which permits active substance to flow through a pressure-holding valve 25 and an interposed pulsation damper 24 through a flow-through sensor 26. The output signal of the flow-through sensor 26 is fed to a metering regulator 27, which triggers the electric motor M of the metering pump 23 in accordance with a predetermined set value.

The active substance flowing out of the flow-through sensor 26 is admixed to a water stream flowing out of a water line 28 through a shut-off valve 29 and a water metering valve 30 to the aspirating side of a high pressure pump 31, with a further pulsation damper 32 interposed. The motor M of the high pressure pump 31 is controlled by an output signal of a controller 21, as is the water metering valve 30. In addition, the controller 21 provides the set value for the metering regulator 27, so that the concentration of the actual active substance, coming from the reservoir 22, in the water coming out of the water line 28 and acting as the carrier medium, can be set by means of the corresponding adjustment values of the controller 21. The treatment medium adjusted in this way reaches a pressure monitor 33, whose output signals are also fed to the controller 21, and finally the nozzles 3. In addition, temperature sensors 5.1.1; 5.1.2 . . . are provided for each of the control devices 20.1 or 20.2, whose output signals are provided as actual values to the controllers 21. Finally, each controller 21 is connected to adjustment value lines coming from the aggregate controller 37, which is provided with the output signals of the actual value sensor 36. Thus the entire arrangement is provided in such a way that the mode of operation described below results:

The nitrogen oxide content and/or the slippage are measured by the actual value sensor 36 in the exhaust gas of the furnace, that is viewed in the flow direction downstream of the nozzles 3 . . . 4. This measured value or these two measured values are fed to the aggregate controller 37, in which a comparison with set values in accordance with the desired emission settings is made. Adjustment values are obtained from this, which are supplied to the multitude of controllers 21. At the same time, the temperature of the flue gases in the partial flow chambers 1 . . . 2 is measured or determined by the temperature sensors 5 . . . 6. The temperature values are provided to the controllers 21 associated with groups of partial flow chambers 1 . . . 2 placed on top of each other. In accordance with the adjustment values coming from the aggregate controller 37, partial adjustment values are formed in the controllers 21, which correspond to the concentrations of active substance in the treatment media intended to be injected into the partial flow chambers for nitrogen oxide removal. The higher the flow speed in a corresponding partial flow chamber 1 . . . 2, the higher the concentration of the active substance in the treatment medium is set, wherein the total of the injected amounts of active substance is predetermined by the aggregate controller 37.

By comparing the set value coming from the controller 21 and the actual value from the flow-through measuring sensor 26, an adjustment value is formed in the metering regulator 27 and supplied to the metering pump 23. Furthermore, the water metering valve 30 is adjusted by the controller 21 in such a way, that a mixture ratio between active substance and water is set on the aspirating side of the high pressure pump 31 such as is predetermined by the aggregate controller 37 and the above mentioned flow parameters.

The control valves 35 are set by the controller 21 in accordance with the temperatures in the flow chambers 1 . . . 2, so that treatment medium is only injected into those partial flow chambers 1 . . . 2 in which the flue gas temperature lies within the predetermined temperature range. At high flow speeds, it can occur that the total amount of active substance to be injected into the partial flow chamber 1 . . . 2 at the highest possible active substance concentration cannot be provided by a single nozzle 3 . . . 4. In this case, several nozzles 2 . . . 3 are utilized by opening the control valves 35.

It is determined by means of the pressure monitor 33 whether the pressure at the outlet of the high pressure pump 31 is in a correct range. For example, in cases where there is no pressure drop at the outlet of the high pressure pump 31 in spite of opening a control valve 35, an appropriate signal is transmitted to the controller 21 (and an acoustic or visual trouble signal to the operators), since obviously the nozzle 3 . . . 4 assigned to the corresponding control valve 35 must be plugged. If, on the other hand, the pressure drop when opening a control valve 35 is uncommonly great, it is possible to determine from this that there is a leak at the assigned nozzle or that it has been completely broken off.

The nozzles 3 . . . 4 whose assigned control valves 35 are not opened are retracted out of the flow chamber. This is described in more detail below by means of FIG. 6, which shows a cross section of a nozzle in the installed state.

Figure 6:
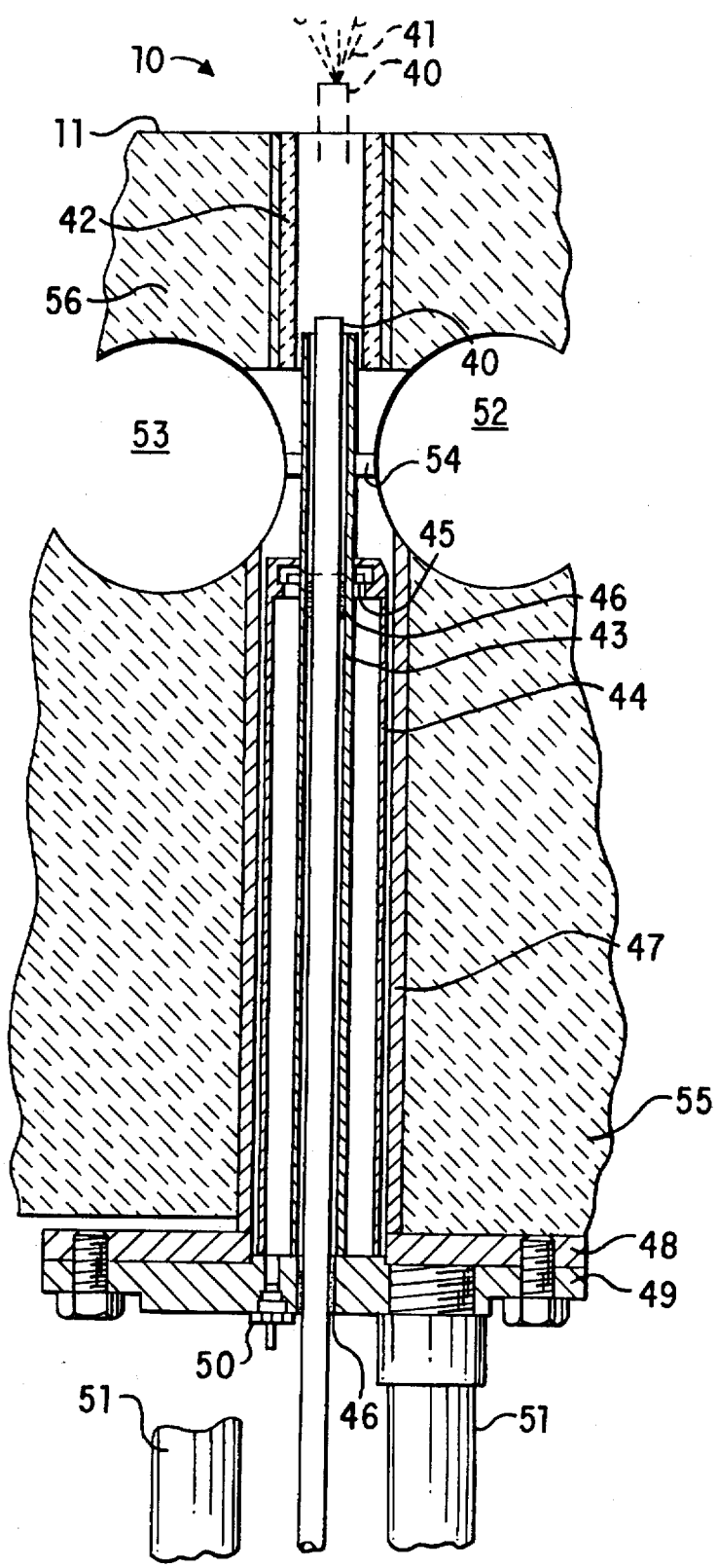
FIG. 6 is a partial cross-sectional view of a nozzle in the installed state.

The particularly preferred embodiment of a nozzle illustrated in FIG. 6 comprises a nozzle rod 40 having a nozzle opening meeting the requirements on one of its ends, by means of which a spray fan 41 can be formed. At the other end, the nozzle rod 40 is connected to the assigned control valve 35 for feeding treatment medium. The nozzle rod 40 is disposed, displaceable in its longitudinal direction, in an interior jacket tube 43 and is sealed against it by seals 46. A concentric, annular-cylindrical conduit is formed between the nozzle rod 40 and the interior jacket tube 43. The interior jacket tube 43 is concentrically seated in an exterior jacket tube 44, so that an annular-cylindrical flow conduit is also formed between the two jacket tubes 43 and 44. This flow conduit is connected by transfer conduits 45 and bores in the interior jacket tube 43 to the annular-cylindrical flow conduit formed between the nozzle rod 40 and the interior jacket tube 43. An air connection 50 terminates in the annular-cylindrical flow conduit between the interior jacket tube 43 and the exterior jacket tube 44 in such a way that compressed air introduced into the air connection 50 can flow through the annular-cylindrical flow conduit between the interior jacket tube 43 and the exterior jacket tube 44 and the transfer conduit 45 into the annular-cylindrical conduit between the nozzle rod 40 and the interior jacket tube 43. The compressed air flows out of the end of the interior jacket tube 43.

A nozzle flange 49 is provided on the end of the nozzle opposite the nozzle opening end, which is held by screws on a further flange 48. This, in turn, is fastened to a tube-shaped installation jacket 47. The installation jacket 47 is seated in a bore in the wall 11 of the flow chamber and projects through an insulation 55 of the wall 11 close to the fin tubes 52, 53. An end of the interior jacket tube 43 extending past the end of the exterior jacket tube 44 and the end of the installation jacket 47 is passed through a bore in a land 54 between the fin tubes 52, 53 and projects (concentrically) into a ceramic tube 42 which terminates in the flow chamber 10. In turn, the ceramic tube 42 is guided as far as shortly in front of the fin tubes 52 and is seated in a fireclay layer 56. The total structure of the wall 11 of the flow chamber 10 with the fin tubes 52, 53 and the interposed land 54 corresponds to a customary structure and is not represented here in detail.

The nozzle rod 40 displaceably seated in the interior jacket tube 43 is connected by adjustment cylinders 51 to the nozzle flange 49 so that, depending on the actuation of the adjustment cylinders 51, the nozzle rod 40 can be retracted into a position in which its end facing the flow chamber 10 lies inside the ceramic tube 42 pulled back out of the flow chamber 10, or projects into the flow chamber 10, as indicated by a broken line in FIG. 6. However, the displacement of the nozzle can also be performed by a suitable electric motor drive.

During operation, compressed air is constantly supplied through the air connection 50 and flows into the ceramic tube 42 and in this way assures that the flue gases in the flow chamber 10 cannot get into the interior of the ceramic tube 42 and to the nozzle rod 40. Thus, there can be no plugging of the nozzle provided in the nozzle rod 40, even if no treatment medium is ejected. Furthermore, the nozzle rod 40 is cooled by the continuous air flow. When the nozzle is activated, that is the adjustment cylinders 51 push the nozzle rod 40 forward into the flow chamber 10, and a spray fan 41 is formed by the outflowing treatment medium, the nozzle rod is still cooled, on the one hand, by the air flow and, on the other hand, also by the treatment medium itself. The air flow assures that in this operational state also no particles contained in the flue gas can damage the nozzle.

By means of the total arrangement described, which is also usable independently of the method described at the outset, it can be assured that the total arrangement is of a slim build, at least in the partial area in which it must pass between the fin tubes 52, 53. The nozzle rod 40 is removed from the effects of the hot and aggressive flue gases in its position of rest, so that a comparatively small cooling air flow, that is a slim flow chamber between the nozzle rod 40 and the interior jacket tube 43, is sufficient for protecting the nozzle rod 40.

It is furthermore possible by means of the embodiment in accordance with the invention of the nozzle to turn it completely off, so that it is not absolutely necessary to let the carrier medium (water) flow out continuously (as up to now), something which up to now has reduced the total effectiveness of the furnace.

We claim:

1. In a method for introducing a liquid or a gaseous treatment medium into a flue gas, stream wherein a total adjustment value for control of a feeding of an active substance of the treatment medium is generated by an actual value measurement of a flue gas component and a comparison with a set value, and the treatment medium is injected through a plurality of nozzles into the flue gas stream flowing through a flow chamber (10), the improvement comprising: dividing the flow chamber (10) into a three-dimensional matrix of partial flow chambers (1.1.1 . . . 2.3.3), each of said partial flow chambers having a nozzle (3.1.1 . . . 4.3.3) and measuring means (5.1 . . . 6.3) for detecting at least a temperature and a flow speed in said partial flow chamber (1.1.1 . . . 2.3.3), continuously calculating an individual partial adjustment value for the active substance for each individual nozzle (3.1.1 . . . 4.3.3), and injecting said active substance with a constant volume flow of treatment medium, whereby a total of the individual partial adjustment values does not exceed a total adjustment value of the active substance, and the nozzles (3.1.1 . . . 4.3.3.) having a partial adjustment value of zero are not activated, so that in each column of the matrix, injection occurs only in a single partial flow chamber (1.1.1 . . . 2.3.3).

2. A method in accordance with claim 1, wherein the treatment medium is injected into said partial flow chambers (1.1.1 . . . 2.3.3), through their respective nozzles (3.1.1 . . . 4.3.3), in which measured temperature values lie within a predetermined reaction temperature range, and the nozzles (3.1.1 . . . 4.3.3) of the remaining partial flow chambers (1.1.1 . . . 2.3.3) which are not activated are retracted out of the flow chamber (10), removing said nozzle tips from exposure to the flue gas stream.

3. A method in accordance with claim 2, wherein for generating the treatment medium, said active substance is admixed to a carrier medium in variable amounts as a function of said partial adjustment value, whereby a volume stream flowing out of each nozzle (3.1.1 . . . 4.3.3) is constant and independent of the partial adjustment value, but contains a concentration of the active substance depending on the partial adjustment value.

4. A method in accordance with claim 3, wherein the active substance is admixed separately for each said nozzle (3.1.1 . . . 4.3.3) in accordance with a calculated set value of said carrier medium thereby forming the treatment medium, after which the mixture is pressurized to more than 10 bar by a high pressure pump (31) and injected through the respective nozzle (3.1.1 . . . 4.3.3).

5. A method in accordance with claim 4, wherein a position of the temperature ranges for each partial flow chamber (1.1.1 . . . 2.3.3) is determined by a radiation energy detector, and the flow speeds are determined with said measuring means (5.1 . . . 6.3) embodied as a plurality of difference temperature measuring sensors, from whose output signals the flow speeds can be derived.

6. A device for executing the method in accordance with claim 1, comprising: a flow chamber (10) divided into a three-dimensional matrix of partial flow chambers (1.1.1 . . . 2.3.3) having at least one group of partial flow chambers (1 . . . 2) located on top of another group of said partial flow chambers on two levels, wherein all of said partial flow chambers (1.1.1 . . . 2.3.3) of one of said levels adjoin a flow chamber wall (11 to 14) and are approximately of the same size, a nozzle (3.1.1 . . . 4.3.3) and measuring means (5.1 . . . 6.3) for detecting at least a temperature and a flow speed for each partial flow chamber (1.1.1 . . . 2.3.3) disposed in each said partial flow chamber and secured to the flow chamber wall (11 to 14) adjoining it, at least one control device (20.1 . . . 20.6), said at least one control device calculating and controlling the partial treatment medium flows for each of the nozzles (3.1.1 . . . 4.3.3) as a function of a total adjustment value which is generated from an actual value measurement of a flue gas component and a comparison with a set value, and from at least one signal from the measuring means (5.1 . . . 6.3), whereby the activated nozzles (3.1.1 . . . 4.3.3) all perform injection with a same constant volume stream, but with an individual concentration of an active substance in a carrier medium.

7. A device in accordance with claim 6, wherein for each row of said nozzles (3.1.1 . . . 4.3.3) of said partial flow chambers (1.1.1 . . . 2.3.3) disposed on top of each other, a separate high pressure pump (31) is provided, said high pressure pump (31) connected by a treatment medium output line to the nozzles (3.1.1 . . . 4.3.3) assigned to the control device (20.1 . . . 20.6) and having an input line connected to a pressure water source and terminating in an admixing line which is provided with an active substance by a metering pump (23), wherein the treatment medium to be conveyed is pumped by the high pressure pump (31) in a previously admixed concentration of the active substance to the activated nozzle (3.1.1 ... 4.3.3) of the row in a constant volume flow.

8. A device in accordance with claim 7, wherein the measuring means (5.1 ... 6.3) comprises at least one difference temperature measuring sensor, said at least one difference temperature measuring sensor producing at least one output signal from which the flow speeds can be derived, and at least one radiation energy detector is provided by which a position of the temperature ranges can be detected for each said partial flow chamber (1.1.1 ... 2.3.3).

9. A device in accordance with claim 7, wherein the plurality of nozzles (3.1.1 ... 4.3.3), are displaceably held in a wall (11) of the flow chamber (10) whereby they are displaceable from a deactivation position outside of the flue gas flow in the flow chamber (10) by an adjustment cylinder (51), or driven by an electric motor, into an activation position inside the flue gas flow in the flow chamber, and vice versa.

10. A device in accordance with claim 9, wherein each of the plurality of nozzles (3.1.1 ... 4.3.3) comprises a nozzle rod (40) displaceably held by an actuation device (51) concentrically in an interior jacket tube (43), whereby an annular-cylindrical flow chamber is formed between the interior jacket tube (43) and the nozzle rod (40), through which compressed air can be conveyed, wherein the interior jacket tube (43) is of a length which is such that when the nozzle tube (40) is retracted, it ends flush with the interior jacket tube (43) and is disposed retracted in the flow chamber wall (11) of the flow chamber (10).

11. A method in accordance with claim 1, wherein for generating the treatment medium, said active substance is admixed to a carrier medium in variable amounts as a function of said partial adjustment value, whereby a volume stream flowing out of each nozzle (3.1.1 ... 4.3.3) is constant and independent of the partial adjustment value, but contains a concentration of the active substance depending on the partial adjustment value.

12. A method in accordance with claim 1, wherein the active substance is admixed separately for each said nozzle (3.1.1 ... 4.3.3) in accordance with a calculated set value of said carrier medium thereby forming the treatment medium, after which the mixture is pressurized to more than 10 bar by a high pressure pump (31) and injected through the respective nozzle (3.1.1 ... 4.3.3).

13. A method in accordance with claim 1, wherein a position of the temperature ranges for each partial flow chamber (1.1.1 ... 2.3.3) is determined by a radiation energy detector, and the flow speeds are determined with said measuring means (5.1 ... 6.3) embodied as a plurality of difference temperature measuring sensors, from whose output signals the flow speeds can be derived.

* * * * *